(12) United States Patent
Armand et al.

(10) Patent No.: US 11,479,626 B2
(45) Date of Patent: Oct. 25, 2022

(54) SINGLE-ION CONDUCTIVE POLYMERS FOR ELECTROCHEMICAL DEVICES

(71) Applicant: Belenos Clean Power Holding AG, Biel/Bienne (CH)

(72) Inventors: Michel Armand, Paris (FR); Maria Martinez-Ibanez, Vitoria-Gasteiz (ES); Eduardo Sanchez Diez, Leioa (ES); Alexander Santiago Sanchez, Salvatierra/Agurain (ES); Heng Zhang, Vitoria-Gasteiz (ES); Uxue Oteo Olea, Bergara (ES)

(73) Assignee: Belenos Clean Power Holding AG, Biel/Bienne (CH)

( * ) Notice: Subject to any disclaimer, the term of this patent is extended or adjusted under 35 U.S.C. 154(b) by 236 days.

(21) Appl. No.: 17/077,092

(22) Filed: Oct. 22, 2020

(65) Prior Publication Data
US 2021/0163649 A1   Jun. 3, 2021

(30) Foreign Application Priority Data
Dec. 3, 2019 (EP) ..................... 19213351

(51) Int. Cl.
*C08F 220/08* (2006.01)
*C08F 210/02* (2006.01)
(Continued)

(52) U.S. Cl.
CPC .......... *C08F 220/08* (2013.01); *C08F 210/02* (2013.01); *H01M 4/386* (2013.01);
(Continued)

(58) Field of Classification Search
CPC ..... C08F 220/08; C08F 210/02; H01M 4/386; H01M 4/485; H01M 4/505; H01M 4/525;
(Continued)

(56) References Cited

U.S. PATENT DOCUMENTS

2014/0272600 A1   9/2014  Bouchet et al.
2019/0088997 A1*  3/2019  Bouchet ............ H01M 10/0569

FOREIGN PATENT DOCUMENTS

CN   103874724 A   6/2014
CN   107459647 A   12/2017
(Continued)

OTHER PUBLICATIONS

Communication dated Jul. 7, 2021 from the Taiwanese Patent Office in Application No. 109136283.
(Continued)

*Primary Examiner* — Matthew J Merkling
(74) *Attorney, Agent, or Firm* — Sughrue Mion, PLLC

(57) ABSTRACT

A solid single-ion conductive polymer comprising a repeat unit of formula (Ia):

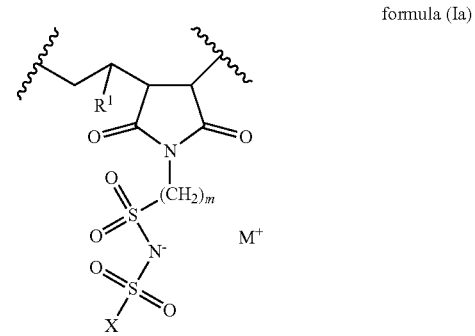

formula (Ia)

wherein $R^1$ is H, or $C_1$ to $C_{16}$ linear or branched alkyl, alkenyl, alkinyl;
m is 1 to 5; each $M^+$ is independently selected from $Li^+$, $Na^+$ or $K^+$; and (Continued)

X is selected from $CF_3$, $CH_3$, or F; and the polymer has an average molecular weight of 350.000 to 1.200.000 Da.

15 Claims, 2 Drawing Sheets

(51) Int. Cl.
<table>
<tr><td>H01M 4/38</td><td>(2006.01)</td></tr>
<tr><td>H01M 4/485</td><td>(2010.01)</td></tr>
<tr><td>H01M 4/505</td><td>(2010.01)</td></tr>
<tr><td>H01M 4/525</td><td>(2010.01)</td></tr>
<tr><td>H01M 4/587</td><td>(2010.01)</td></tr>
<tr><td>H01M 4/62</td><td>(2006.01)</td></tr>
<tr><td>H01M 10/0525</td><td>(2010.01)</td></tr>
<tr><td>H01M 10/0565</td><td>(2010.01)</td></tr>
</table>

(52) U.S. Cl.
CPC .......... *H01M 4/485* (2013.01); *H01M 4/505* (2013.01); *H01M 4/525* (2013.01); *H01M 4/587* (2013.01); *H01M 4/622* (2013.01); *H01M 4/625* (2013.01); *H01M 10/0525* (2013.01); *H01M 10/0565* (2013.01); *C08F 2810/50* (2013.01); *H01M 2300/0082* (2013.01)

(58) Field of Classification Search
CPC ...... H01M 4/587; H01M 4/622; H01M 4/625; H01M 10/0525; H01M 10/0565
See application file for complete search history.

(56) References Cited

FOREIGN PATENT DOCUMENTS

<table>
<tr><td>CN</td><td>108 878 777 A</td><td>11/2018</td></tr>
<tr><td>JP</td><td>2000-149660 A</td><td>5/2000</td></tr>
<tr><td>JP</td><td>2005-100966 A</td><td>4/2005</td></tr>
<tr><td>KR</td><td>10-2018-0011207 A</td><td>1/2018</td></tr>
<tr><td>WO</td><td>2016/196688 A1</td><td>12/2016</td></tr>
</table>

OTHER PUBLICATIONS

Search Report dated Jun. 28, 2021 in Application No. 109136283.
Communication issued Jul. 13, 2021 by the Japanese Patent Office in Japanese Application No. 2020-186262.
Hien The Ho et al., "A post-polymerization functionalization strategy for the synthesis of sulfonyl (trifluoromethanesulfonyl)imide functionalized (co)Polymers", Polymer Chemistry, 2017, vol. 8, No. 37, pp. 5660-5665 (6 pages).
European Search Report for corresponding EP 19 21 3351, dated May 13, 2020.

\* cited by examiner

SINGLE-ION CONDUCTIVE POLYMERS FOR ELECTROCHEMICAL DEVICES

CROSS REFERENCE TO RELATED APPLICATIONS

This application claims priority to European Patent Application No. 19213351.0 filed Dec. 3, 2019, the entire contents of which are incorporated herein by reference.

FIELD OF THE INVENTION

The present invention is in the field of energy storage devices, in particular lithium-based energy storage devices, more particularly batteries. Specifically, the invention is in the field of ion conductive polymers and their uses.

BACKGROUND OF THE INVENTION

The importance of batteries and other energy storage devices is growing rapidly. Next generation consumer electronics such as smartphones, tablet computers or laptops are part of almost everyone's life and are expected to have sufficient battery storage for extended periods of use.

Further, the rise of e-mobility, in particular electronically driven automobiles and e-scooters, requires batteries with high capacity and a reasonable weight. Current research in battery technology evolves around new materials to improve the safety of batteries as well as increasing and optimizing volumetric and gravimetric energy density.

The most commonly used rechargeable batteries are Li-batteries, which are nowadays used in portable electronics and even electric vehicles. Li-batteries are so important today that the 2019 nobel prize in physics was awarded to the pioneers of this technology.

Lithium batteries are commonly based on three essential components: two electrodes, anode and cathode, as well as an electrolyte. The anode is usually based on carbon, in most cases graphite, while the cathode is often based on one of three base materials, a layered oxide, a polyanion or a spinel. As lithium is a highly reactive metal, the electrolyte is often a non-aqueous liquid electrolyte based on mixtures of organic carbonates comprising complexes of lithium or other alkali metal ions.

The advantages of these liquid non-aqueous electrolytes are a high Li-ion conductivity and a good solid-electrolyte-interface formation. However, these electrolytes also show significant disadvantages, such as being volatile and flammable. As such, defective or inadequate Li batteries using these liquid non-aqueous electrolytes are a safety risk. Aside from liquid electrolytes, lithium batteries are now also built using solid electrolytes.

One class of electrolytes, which may be a suitable alternative, are polymer electrolytes which can offer significant advantages in terms of thermal and electrochemical stability. A further alternative are inorganic solid electrolytes, which offer an advantage of a better thermal stability, at the cost of a reduced flexibility.

A new class of polymer electrolytes are single-ion conductive polymer electrolytes. These polymers are in general lithiated ionomers with a poly(ethylene oxide) functionality and tethered anions. These electrolytes can show high oxidative stability and support higher charge/discharge rates.

There is no single electrolyte which is suitable for all applications. There is ongoing research for new electrolytes, in particular polymer electrolytes which show advanced or adjustable properties.

SUMMARY OF THE INVENTION

The present invention relates to novel single-ion conductive polymers, their production and the use of said polymers in batteries. The novel polymers are suitable as electrolyte material and can be used in an anode or cathode of a rechargeable lithium battery.

The new polymers offer several advantages, in particular the possibility to adjust the porosity of an electrode using said polymers, thus allowing a control of the volumetric energy density.

DETAILED DESCRIPTION OF THE INVENTION

Figure 1A:
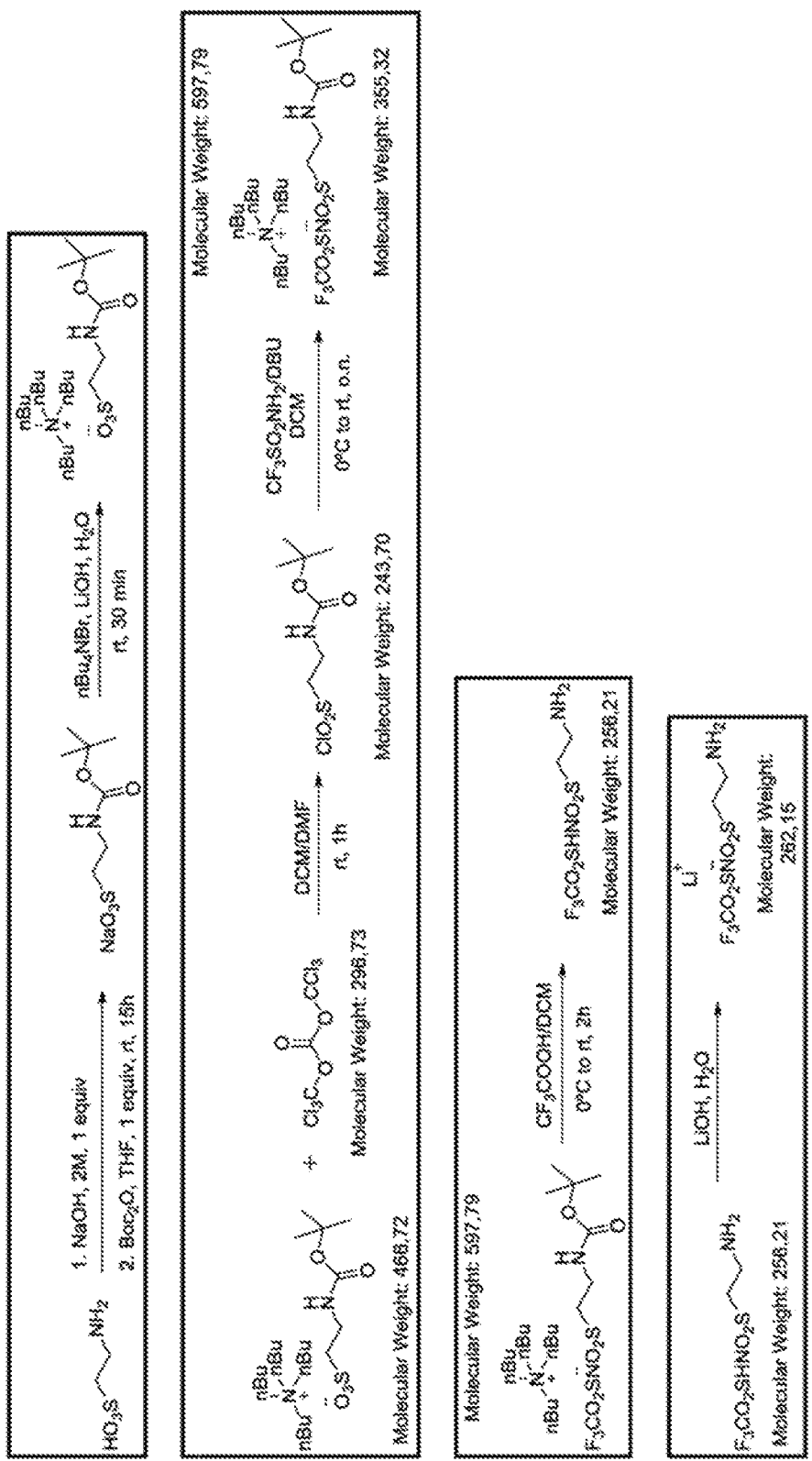
FIGS. 1A and 1B: Reaction scheme of the synthesis of the polymer of the invention

The invention relates to a solid single-ion conductive polymer comprising a repeat unit of formula (Ia):

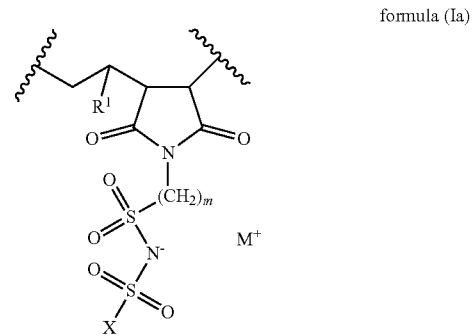

formula (Ia)

wherein $R^1$ is H, or $C_1$ to $C_{16}$ linear or branched alkyl, alkenyl, alkinyl;

m is 1 to 5;

each $M^+$ is independently selected from $Li^+$, $Na^+$ or $K^+$; and

X is selected from $CF_3$, $CH_3$, or F;

and the polymer has an average molecular weight of 350.000 to 1.200.000 Da.

In a particular embodiment, the invention relates to solid single-ion conductive polymers of the general formula (I)

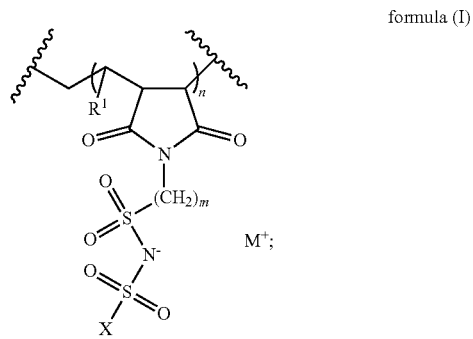

formula (I)

wherein $R^1$ is H, or $C_1$ to $C_{16}$ linear or branched alkyl, alkenyl, alkinyl;
n is 50 to 5000;
m is 1 to 5;
each $M^+$ is independently selected from $Li^+$, $Na^+$ or $K^+$; and
X is selected from $CF_3$, $CH_3$, or F.

The polymers of the present invention are particularly suitable for use in rechargeable batteries, especially lithium batteries. A particular advantage of the polymers of the invention is their porosity, which can be adjusted e.g. based on the treatment during the preparation of an electrode. As such, the polymers allow to adjust the volumetric energy density of a battery comprising said solid single-ion conductive polymer.

The invention further relates to an electrode for a battery comprising a solid single-ion conductive polymer of the present invention and a battery comprising an electrode of the invention or the polymer of the invention.

In a further aspect, the invention relates to a method of producing the solid single-ion conductive polymer of the present invention.

The different aspects and embodiments of the invention are discussed in detail below.

In one aspect invention relates to a solid single-ion conductive polymer comprising a repeat unit of formula (Ia):

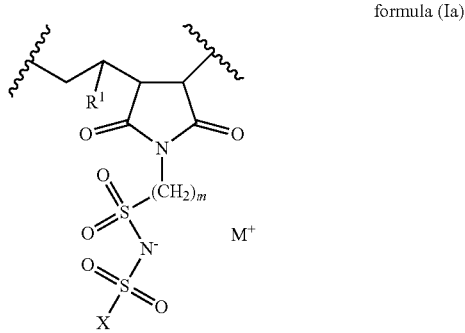

formula (Ia)

wherein $R^1$ is H, or $C_1$ to $C_{16}$ linear or branched alkyl, alkenyl, alkinyl;
m is 1 to 5;
each $M^+$ is independently selected from $Li^+$, $Na^+$ or $K^+$; and
X is selected from $CF_3$, $CH_3$, or F;
and the polymer has an average molecular weight of 350.000 to 1.200.000 Da.

In a particular embodiment invention relates to solid single-ion conductive polymers of the general formula (I)

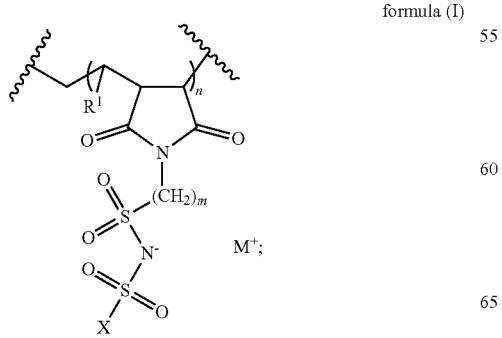

formula (I)

wherein $R^1$ is H, or $C_1$ to $C_{16}$ linear or branched alkyl, alkenyl, alkinyl;
n is 50 to 5000;
m is 1 to 5;
each $M^+$ is independently selected from $Li^+$, $Na^+$ or $K^+$; and
X is selected from $CF_3$, $CH_3$, or F.

$R^1$ may be H or a linear or branched $C_1$ to $C_{16}$ alkyl, alkenyl or alkinyl.

In a preferred embodiment $R^1$ is $C_1$ to $C_{16}$ linear or branched alkyl. Preferred $C_1$ to $C_{16}$ linear or branched alkyl moieties include methyl, ethyl, propyl, buthyl, pentyl, hexyl, heptyl, octyl, nonyl, decyl, undecyl, dodecyl, isopropyl, $C(CH_3)_3$. Preferably, the linear or branched alkyl is selected from linear $C_1$-$C_{16}$ alkyl, preferably $C_1$ $C_8$ linear or branched alkyl, particularly preferred linear, unsubstituted $C_1$ $C_8$ alkyl.

In some embodiments, $R^1$ is selected from methyl, ethyl, propyl, buthyl or isopropyl. In particularly preferred embodiments $R^1$ is methyl, ethyl or propyl, most preferably ethyl.

In some embodiments m is an integer selected from 1, 2, 3, 4 or 5. Preferably, m is 1, 2 or 3. In a particularly preferred embodiments, m is 2.

In some embodiments n is 200 to 1000. In a preferred embodiment n is 200 to 500.

In an alternative embodiment the solid single-ion conductive polymer has an average molecular weight of 400.000 to 1.000.000 Da.

X is preferably a halogen or a group comprising a halogen. In preferred embodiments, X is selected from $CF_3$, $CCl_3$, $CBr_3$, F, Cl or Br. In particular preferred embodiments, X is selected from $CF_3$, CCl, $CBr_3$ or $Cl_3$. In a particular embodiment, X is $CF_3$.

In a specific embodiment, the invention relates to a solid single-ion conductive polymer comprising a repeat unit of formula (Ia):

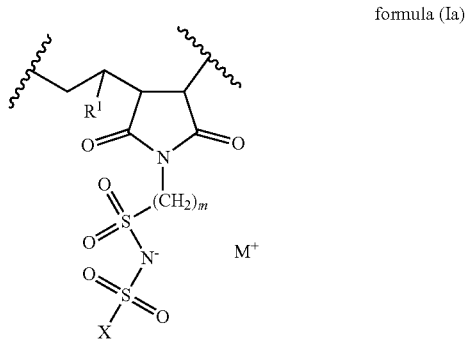

formula (Ia)

Wherein
$R^1$ is $C_8$ to $C_{16}$ alkyl;
$M^+$ is selected from $Li^+$ or $Na^+$;
X is selected from $CF_3$, $CBR_3$, $CCl_3$.

In a particular embodiment the invention relates to a solid single-ion conductive polymer comprising a repeat unit of formula (Ia):

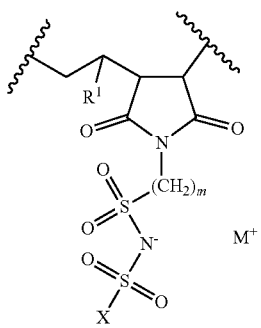

formula (Ia)

Wherein
$R^1$ is $C_{16}$ alkyl;
$M^+$ is $Li^+$;
X is $CF_3$.

The solid single-ion conductive polymer of the invention has several advantageous properties. The polymer of the invention is compatible with different electroactive materials. As such the polymer is suitable as electrolyte in batteries, but also as part of an anode or cathode.

The solid single ion conductive polymer can be produced in several ways, which are readily apparent to the skilled person. In one aspect the invention relates to a method for producing a solid single ion conductive polymer according to the present invention.

The inventors found that a polymer according to the invention can be produced by grafting a compound of formula (III) onto a polymer of formula (II). Alternative methods of producing a polymer of formula (I) are known to the skilled person.

In one embodiment, the invention relates to a method for producing a solid-single-ion conductive polymer of formula I as described above comprising the steps of:

a) providing a polymer of

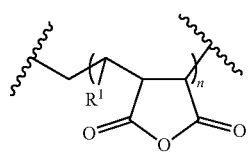

formula (II)

wherein
$R^1$ is H, or $C_1$ to $C_{16}$ linear or branched alkyl, alkenyl, alkinyl; and
n is 85 to 3900;

b) reacting said polymer with a compound of formula (III)

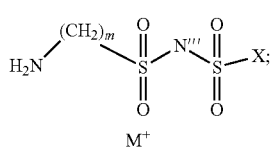

formula (III)

Wherein
m is 1 to 5;
$M^+$ is selected from $Li^+$, $Na^+$ or $K^+$;
X is selected from $CF_3$, $CH_3$, $CBR_3$, $CCl_3$, F, Cl, Br, H or OH.

Preferred embodiments for $R^1$, n, $M^+$, m and X are the same preferred embodiments as for the polymer as defined above.

Suitable reaction conditions for producing a polymer according to the present invention are known to the skilled person. In one non-limiting embodiment the polymer of formula (II) is reacted with a compound of formula (III) in a suitable solvent under reflux conditions. In one embodiment said solvent is dimethylformamide (DMF) or DMSO. In general, any solvent in which the polymer is soluble is suitable.

In further aspects, the invention relates to a battery comprising a solid single-ion conductive polymer as defined above as well as electrodes comprising said solid single-ion conductive polymer.

Accordingly, in one embodiment, the invention relates to an electrode comprising a solid single-ion conductive polymer as described above.

Preferably, said electrode is an electrode for a battery. However, said polymer may be used in any kind of electrodes.

An electrode comprising a solid single-ion conductive polymer according to the present invention may be any kind of electrode. In a battery, an electrode comprising said polymer may be either the anode, cathode or both electrodes may comprise the polymer.

Accordingly, in one embodiment, the invention relates to an electrode, wherein the electrode is a cathode, comprising a solid single-ion conductive polymer of formula I according to the invention. In a preferred embodiment said cathode comprises a polymer according to the invention, an electroactive material, preferably cathode electroactive material and optionally conductive carbon.

In a further embodiment, the invention relates to an electrode, wherein the electrode is an anode, comprising a solid single-ion conductive polymer according to the invention, an electroactive material, preferably anode electroactive material, and optionally a conductive carbon.

Non-limiting examples of conductive carbon include graphite, graphene and carbon nanotubes.

The solid single-ion conductive polymer according to the present invention can be used with essentially any electroactive material. In particular, the polymer of the invention may be used with any cathode electroactive material and any anode electroactive material.

Non-limiting examples for cathode electroactive materials include lithium cobalt oxide, lithium manganese nickel cobalt oxide, lithium nickel cobalt aluminium oxide, lithium iron phosphate, lithium manganese oxide and spinels.

Non-limiting examples for anode electroactive materials include graphite, carbon nanotubes, silicon/carbon compositions, tin/cobalt alloys and lithium titanate.

Accordingly, in one embodiment, the invention relates to an electrode, in particular a cathode as defined above, wherein the cathode electrode material is selected from Lithium cobalt oxide, lithium manganese nickel cobalt oxide, lithium nickel cobalt aluminium oxide, lithium iron phosphate, lithium manganese oxide and a spinel.

In a further embodiment, the invention relates to an electrode, in particular an anode as defined above, wherein the anode active material is selected from graphite, carbon nanotubes, silicon/carbon compositions, tin/cobalt alloys and lithium titanate.

It is readily apparent to the skilled person to select appropriate amounts of the polymer according to the invention for an electrode. In some embodiments of the invention, an electrode comprising the solid single-ion conductive polymer of the invention comprises up to 25 wt % of the polymer of the invention. In some embodiments the electrode comprises about up to 10 wt %, about up to 15 wt % or about up to 20 wt % of the solid single-ion conductive polymer.

The use of the solid single-ion conductive polymer of the invention is not limited to electrodes in a battery. In some embodiments, the invention relates to a battery comprising the solid single-ion conductive polymer of the present invention as a solid electrolyte.

The inventors surprisingly found that the solid single-ion conductive polymer of the present invention can be calendered, which allows to adapt the porosity of the polymer and thus of electrodes, in particular cathodes and anodes. Thus, it is possible to adapt the porosity of an electrode utilizing the polymer of the invention, which allows to specifically adjust the energy density of a battery using said electrodes.

Accordingly, in one embodiment, the invention relates to an electrode comprising the solid single-ion conductive polymer of the invention or a battery comprising said electrode, wherein the electrode was calendered.

The porosity of the polymer or the electrode can be adjusted by the calendering temperature. The inventors found that the porosity of an electrode is lower if the electrode was calendered at higher temperatures.

Accordingly, in one embodiment, the invention relates to an electrode comprising the solid single-ion conductive polymer of the invention or a battery comprising said electrode, wherein the electrode was calendered at a temperature of between 20 to 110° C. In some embodiments the electrode was calendered at 40° C. 60° C. 80° C. or 100° C.

The invention further relates to an electrode as defined above, comprising a solid single-ion conductive polymer according to the invention, wherein the electrode has a porosity of up to 50%. In particular embodiments, the electrode has a porosity of about 10% to about 50%.

In a further embodiment, the invention relates to an electrolyte for use in batteries comprising a solid single-ion conductive polymer as defined above.

The invention also relates to a battery comprising the solid single-ion conductive as defined above, or at least one electrode as defined above or an electrolyte as defined above or a combination thereof.

In a further aspect the invention relates to a method of producing an electrode (a cathode or an anode) for a battery comprising the steps of:
a) providing a solid single-ion conductive polymer of the invention as defined above
b) providing cathoide or anode electroactive materials and optionally conductive carbon
c) combining the polymer and the electroactive materials and optionally conductive carbon
d) optionally calendering the electrode.

The electrode may be calendered at the conditions described above. In some embodiments the electrode is calendered at a temperature between 20 and 110° C. In some embodiments, the electrode is calendered at 40° C., 60° C., 80° C. or 100° C.

The invention relates in particular to the following numbered items:

1. A solid single-ion conductive polymer comprising a repeat unit of formula (Ia):

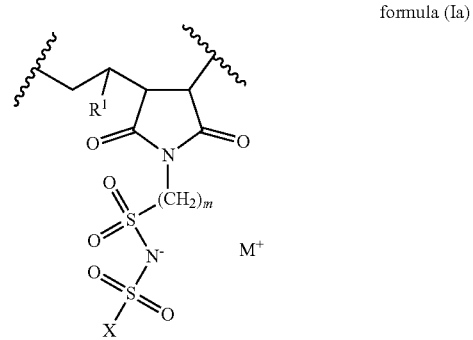

formula (Ia)

wherein $R^1$ is H, or $C_1$ to $C_{16}$ linear or branched alkyl, alkenyl, alkinyl;
m is 1 to 5;
each $M^+$ is independently selected from $Li^+$, $Na^+$ or $K^+$; and
X is selected from $CF_3$, $CH_3$, or F;
and the polymer has an average molecular weight of 350.000 to 1.200.000 Da.

2. A solid single-ion conductive polymer according to item 1, wherein the polymer is of formula (I)

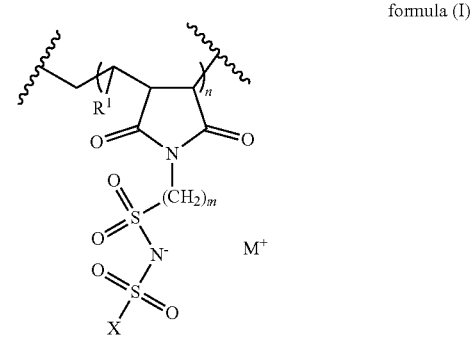

formula (I)

Wherein
$R^1$ is H, or $C_1$ to $C_{16}$ linear or branched alkyl, alkenyl, alkinyl;
n is 85 to 3900;
m is 1 to 5;
each $M^+$ is independently selected from $Li^+$, $Na^+$ or $K^+$;
X is selected from $CF_3$, $CH_3$, $CBR_3$, $CCl_3$, F, Cl, Br, H or OH.

3. The solid single-ion conductive polymer of item 1 or 2, wherein R1 is a C1-C18 linear or branched alkyl.

4. The solid single-ion conductive polymer of item 3, wherein R1 is a C10-C18 linear or branched alkyl.

5. The solid single-ion conductive polymer of any preceding item, wherein m is 2.

6. The solid single-ion conductive polymer of any preceding item, wherein X is CF3.

7 The solid single-ion conductive polymer of any one of items 2 to 6, wherein n is 200 to 500.

8. The solid single-ion conductive polymer of any preceding item, wherein R1 is C16 linear alkyl, m is 2, M+ is Li and X is CF3 and the polymer has an average molecular weight of 400.000 Da to 1.000.000 Da.

9. An electrode for a battery comprising the solid single-ion conductive polymer of any one of items 1 to 8.

10. The electrode of item 9, wherein said electrode is a cathode additionally comprising cathode electroactive material and optionally a conductive carbon.

11. The electrode according to item 10, wherein the cathode electroactive material is selected from lithium cobalt oxide, lithium mangane nickel cobalt oxide, lithium nickel cobalt aluminium oxide, lithium iron phosphate, or a spinel.

12. The electrode of item 9, wherein said electrode is an anode, additionally comprising anode electroactive material and optionally a conductive carbon.

13. The electrode of item 12, wherein the anode electroactive material is selected from graphite or carbon nanotubes, silicium, lithiumtinatates or tin oxide.

14. The electrode of item 12 or 13, wherein the conductive carbon is graphite, graphene or carbon nanotubes.

15 The electrode according to any one of items 9 to 14, wherein the electrode comprises up to 25 wt % of the solid single-ion conductive polymer.

16 The electrode according to item 15, wherein the electrode comprises about up to 10 wt %, about up to 15 wt % or about up to 20 wt % of the solid single-ion conductive polymer.

17 The electrode according to any one of items 9 to 16, wherein the electrode was calendered.

18. The electrode according to item 17, wherein the electrode was calendered at a temperature of between 20 to 110° C.

19. The electrode according to item 18, wherein the electrode was calendered at 40° C., 60° C., 80° C. or 100° C.

20. The electrode according to any one of items 9 to 19, wherein the electrode has a porosity of up to 50%.

21. The electrode according to items 20, wherein the electrode has a porosity of about 10% to about 50%.

22. An electrolyte for use in batteries, comprising a solid single-ion conductive polymer according to any one of items 1 to 8.

23. A battery comprising the conductive polymer according to any one of items 1 to 8, at least one electrode according to any one of items 9 to 21 or an electrolyte according to claim 22.

24. A battery according to item 23, wherein said battery is lithium or sodium battery.

25. A method for producing a solid-single-ion conductive polymer according to any one of item s1 to 8 comprising the steps of:
a) providing a polymer of formula (II)

formula (II)

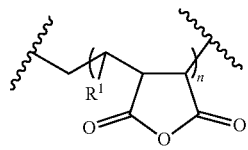

wherein
$R^1$ is H, or $C_1$ to $C_{16}$ linear or branched alkyl, alkenyl, alkinyl; and
n is 85 to 3900;

b) reacting said polymer under suitable conditions with a compound of formula (III)

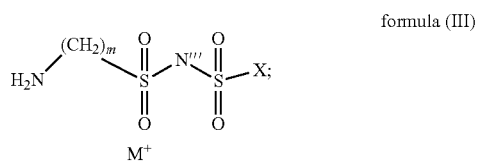

formula (III)

Wherein
m is 1 to 5;
$M^+$ is selected from $Li^+$, $Na^+$ or $K^+$;
X is selected from $CF_3$, $CH_3$, $CBR_3$, $CCl_3$, F, Cl, Br, H or OH.

EXAMPLES

Example 1 Synthesis of the Solid Single-Ion Conductive Polymer by Grafting

The polymers in this invention were prepared by grafting an amine-terminated anion to maleic anhydride polymer backbone. Firstly, the amine-terminated anions were prepared from the reaction of amino sulfonyl chlorides, NR2(CH2)mSO2Cl, and trifluoromethanesulfonamide, CF3SO2NH2, in the presence of a non-nucleophilic base. Intermediates containing non-nucleophilic ammonium cation-containing trifluoromethanesulfonyl imides were converted to the desired cation salt (typically lithium) via standard methods known in the state-of-art. Then, the amine-terminated anion was grafted to maleic anhydride polymer backbone. Taking the polymer with the chemical structure shown in Scheme 1 (hereafter abbreviated as polymer 1 #) as an example, the synthetic details are given below.

Scheme 1 Structure of polymer 1#

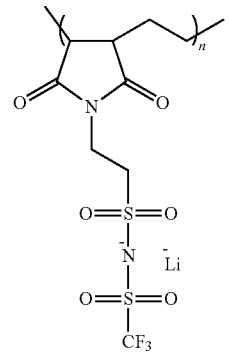

1) Synthesis of the Amine-Terminated Anion

The synthetic procedure of lithium (2-aminoethanesulfonyl)(trifluoromethanesulfonyl)imide (LiATI) as an example is described in Scheme 2; see also FIG. 1A.

Scheme 2. The synthetic route for lithium (2-aminoethanesulfonyl)-trifluoromethanesulfonyl)imide.

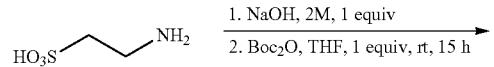

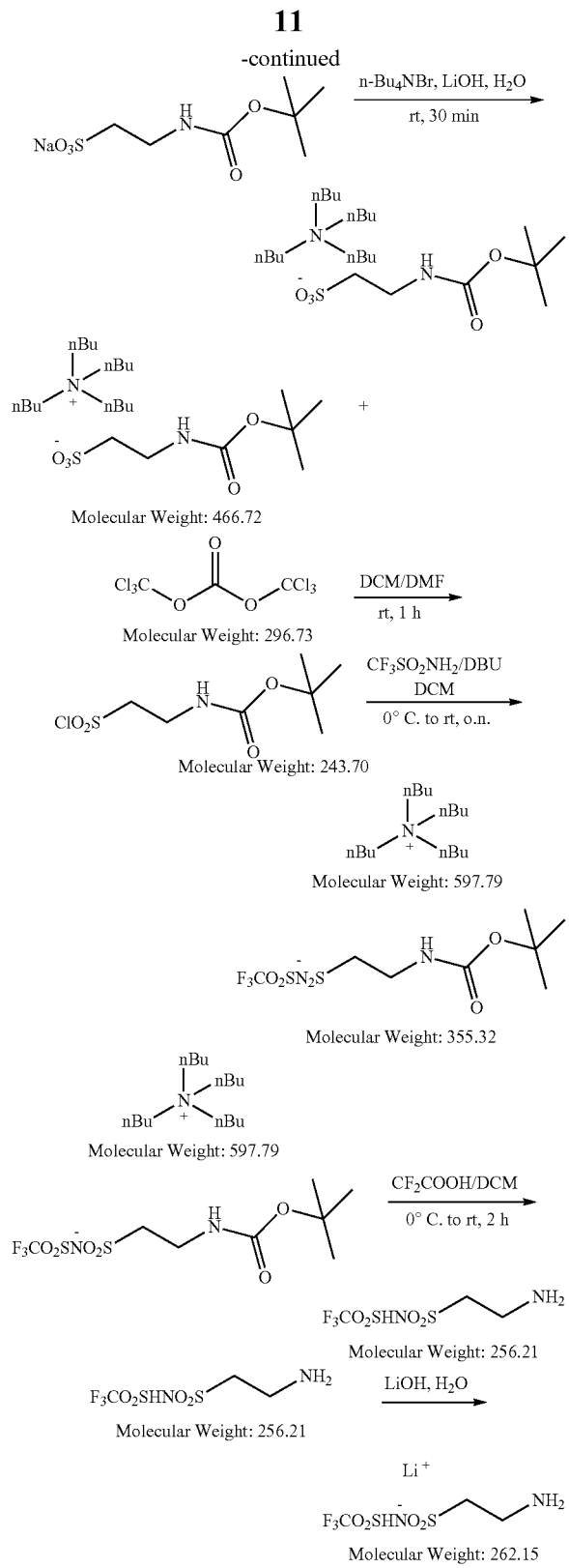

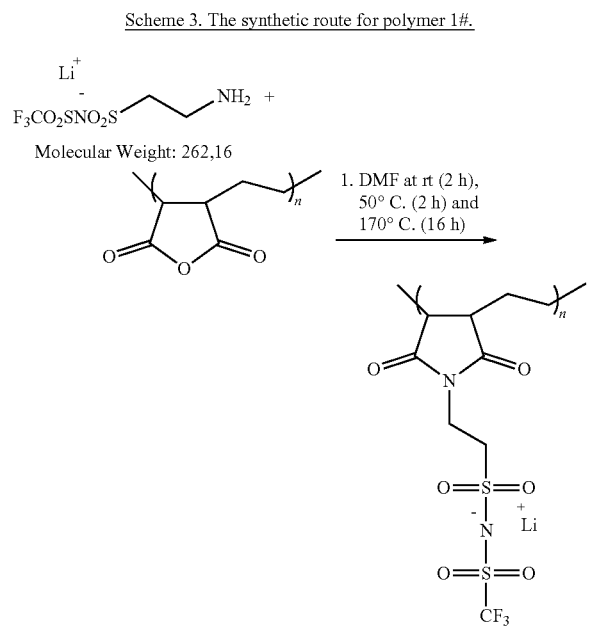

A solution of taurine (20 g, 160 mmol) in aqueous NaOH (2M, 6.4 g, 1 eq., 160 mmol) was treated by dropwise addition with a solution of (Boc)2O (34.9 g, 1 eq., 160 mmol) in THF (25 mL) at 0° C. The mixture was stirred at room temperature for 15 h and the disappearance of (Boc)2O was monitored by TLC. The resulting mixture was extracted once with diethyl ether (80 mL). The aqueous phase was diluted with water (650 mL), treated with LiOH (3.8 g, 1 eq., 160 mmol) and n-Bu4Br (52.6 g, 1 eq., 160 mmol), and stirred at room temperature for 30 min. The resulting mixture was then extracted with dichloromethane (3×200 mL), the organic phase dried and evaporated at reduced pressure to yield NBoc-taurine nBu4N. salt.

A solution of N-Boc-taurine n-Bu4N. salt (61.3 g, 131.3 mmol) in dichloromethane (340 mL) was treated with DMF (2.2 mL) and then with triphosgene (15.6 g, 0.4 eq., 52.5 mmol) at 0° C. and then allow to reach room temperature while stirring. The reaction mixture was stirred at room temperature for a further 60 min, then cooled to 0° C. and treated with a solution of DBU (42.0 g, 2.1 eq., 275.8 mmol) and CF3SO2NH2 (29.4 g, 1.5 eq, 197.0 mmol) in dichloromethane (43 mL) by dropwise addition (20 min). Those were previously mixed at 0° C. as well. The mixture was stirred overnight at room temperature, then washed with aqueous NH4Cl saturated solution (2×100 mL) and brine (2×100 mL). Silica was added to the dichloromethane solution and then filtered off after stirring for 1 h. Then solvent was partially removed in vacuo. Trifluoroacetic acid (28 mL, 7 eq., 367.0 mmol) was added at 0° C. and then allowed to reach room temperature. It was stirred for 1-2 h. The product precipitated in the reaction media. It was filtered and washed with dichloromethane. Product was isolated as a white powder Traces of CF3SO2NH2 can be removed by sublimation. A solution of LiOH (2.3 g, 2 eq., 94.5 mmol) in H2O (160 mL) was added slowly. The reaction mixture was stirred for 16 h at room temperature. Then solvent was removed in vacuo to yield a white solid. Excess of LiOH was removed by redissolving in acetonitrile and filtering of undissolved LiOH. Solvent was removed in vacuo to yield LiATl a white powder (12 g, 46 mmol). $^1$H NMR (300 MHz, D2O) δ (ppm) 3.43 (t, J=6.6 Hz, 2H, S—CH2), 3.15 (t, J=6.5 Hz, 2H, N—CH2); $^{19}$F-NMR (282 MHz, D2O) δ (ppm) −78.54.

2) Grafting the Amine-Terminated Anion to the Polymer Backbone

Figure 1B:
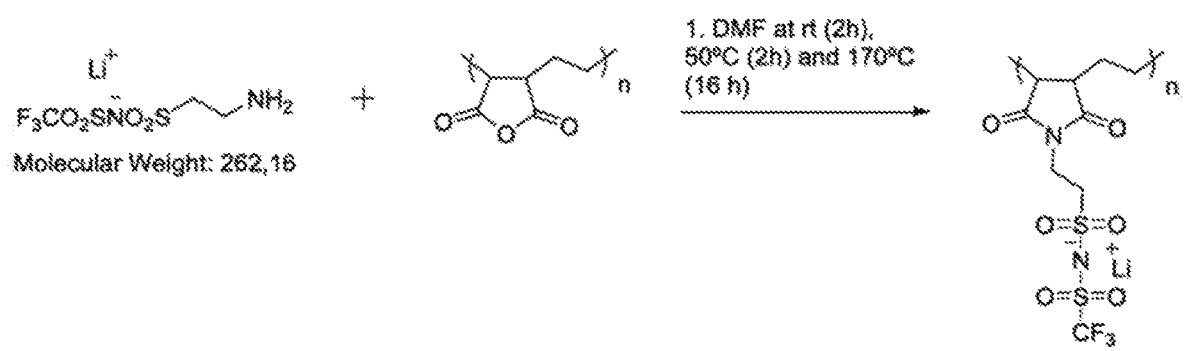

This synthetic procedure is described in Scheme 3; see also FIG. 1B. 9 g of LiATl dissolved in 70 mL of dry dimethylformamide were added over a solution of Poly(ethylene-alt-maleic anhydride) in dimethylformamide (110 mL). The reaction was kept at room temperature for 2 h, at 50° C. for 2 h and under reflux (170° C.) for 16 h. Solvent was mostly removed under reduced pressure and product was precipitated in THF (2×500 mL) and the obtained viscous solid was dialyzed against deionized water. Water was removed under reduced pressure to yield polymer 1 # (10 g, 25.7 mmol). 1H NMR (300 MHz, $D_2O$) δ (ppm) 4.09-3.68 (m, 2H, S—$CH_2$), 3.58-3.33 (m, 2H, N—$CH_2$), 2.78-2.52 (m, 2H, CH—CH), 2.10-1.51 (m, 4H, CH—$CH_2$—$CH_2$). 19F-NMR (282 MHz, $D_2O$) δ (ppm) −78.18.

Example 2: Preparation of a Cathode for a Battery Using Polymer 1 #

The NMC cathode slurry was prepared by mixing 6.375 g of NMC 111 ($LiNi_{1/3}Mn_{1/3}Co_{1/3}O_2$) powder with 0.375 g of C-65 conductive carbon in a mortar until a homogenous dispersion was formed. In a vial 0.750 g of polymer 1 # was dissolved in 7 grams of N-methyl-pyrrolidone (NMP) until complete dissolution. The mixture of NMC/C-65 was added to the binderlyte solution and mixed at 10K rpm for 2 minutes. Subsequently, another 2 grams of NMP solvent were added (9 grams of NMP in total). The resulting solution was mixed 20 minutes at 13 k rpm. The final slurry was allowed to degas for 5 hours to eliminate possible air bubbles generated during mixing.

The cathodes were fabricated by coating the slurry over an aluminum current collector foil and drying at 100° C. overnight under vacuum. The mass loading of the active material before calendaring varied from 15 $mg/cm^2$ to 19 $mg/cm^2$ with a porosity of 46%.

The calendaring procedure was done in a dry room at controlled temperature (22° C. and dew point −60° C.). The rollers were let to temper for 1 hour at 100° C. The laminate was passed four times (two in each direction) for each selected rollers opening at a speed of 0.4 m/min. The first gap between rollers was selected close to the laminate thickness (76 μm) to be progressively decreased later (56 μm and 46 μm). The calendaring pressure was controlled to be lower than 43 Tons. The laminate was punched at 12 mm of diameter with an automatic puncher and dried at 50° C. under vacuum overnight. The mass loading for the active material after calendaring varied from 15 $mg/cm^2$ to 19 $mg/cm^2$ with a porosity of 24%.

Example 3: Effects of Calendaring Temperature of Cathode Porosity

Cathodes were prepared as described above, utilizing different temperatures of the rollers during calendaring. The following table shows thows the porosity of the calendered cathode dependent of the calendaring temperature:

| Calendering Temperature | Porisity in % |
| --- | --- |
| No calendaring | 46 ± 2 |
| 40° C. | 39 ± 2 |
| 80° C. | 36 ± 2 |
| 100° C. | 24 ± 2 |

Example 4: Battery Preparation Using a Cathode Comprising Polymer 1 #

Coin cells were composed of $LiNi_{1/3}Mn_{1/3}Co_{1/3}O_2$ (NMC111) as the active material of the positive electrode and lithium metal as the negative electrode. The cathode was prepared as described above and calendered at 100° C. The electrolyte used for the coin cell preparation contained 1 mol/L $LiPF_6$ in a 1:1 solvent blend by volume of ethylene carbonate (EC) and methyl ethyl carbonate (EMC). A Celgard® 2400 microporous membrane was used as separator.

Coin cells were assembled in an argon-filled glove box following the configuration. The NMC cathode (12 mm of diameter) was wetted with 80 μL of the electrolyte solution. Over that, a Celgard 2400 membrane of 16 mm of diameter was used as separator between electrodes. The NMC 111 electrode was paired versus a Li metal disc of 14 mm of diameter and 500 μm of thickness. A stainless steel spacer and spring were added to the cell before closing.

The theoretical capacity of NMC 111 was fixed to 150 mAh/g. The cells were evaluated using a Maccor Battery Tester (Series 4000) in an oven at 25° C. at different C-rates. The procedure used for testing the cells was as follows.

Figure 2:
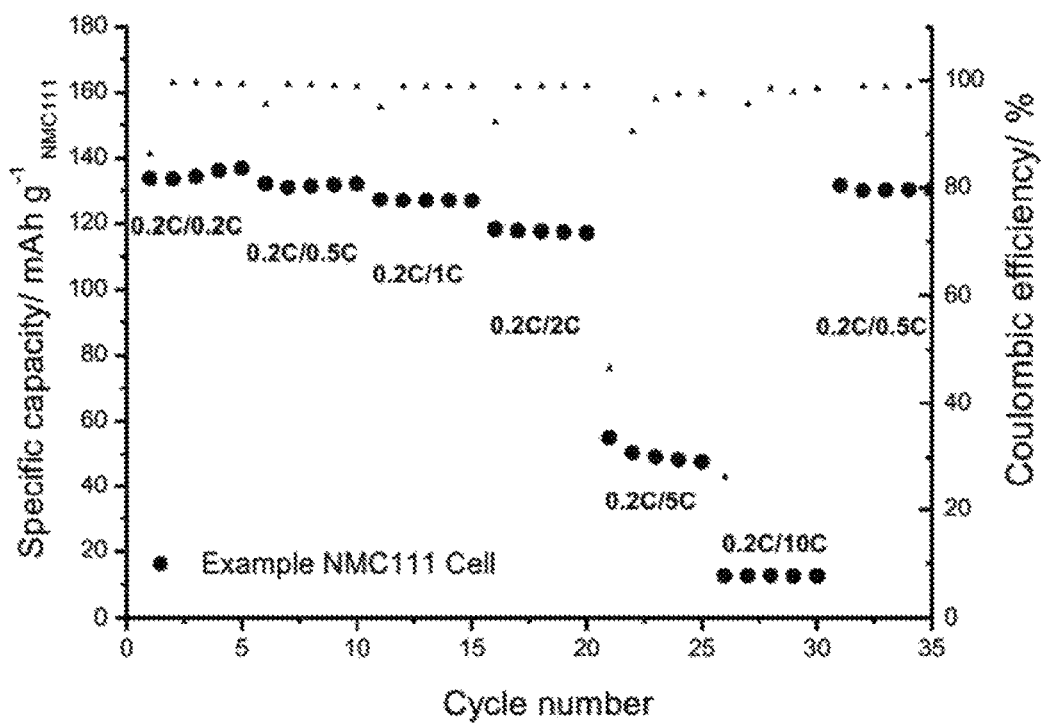
FIG. 2: Performance of batteries utilizing the polymer of the invention

First 24 h of resting at 25° C., then the batteries were kept at a constant charging rate of 0.2 C, while the discharge rate was changed gradually as follows: 5 cycles at 0.2 C, other 5 at 0.5 C, other 5 at 1 C, 5 at 2 C, 5 at 5 C, 5 at 10 C and 5 at 0.5 C. An example of the cell performance with this cycling procedure is showed in FIG. 2.

The invention claimed is:

1. A solid single-ion conductive polymer comprising a repeat unit of formula (Ia):

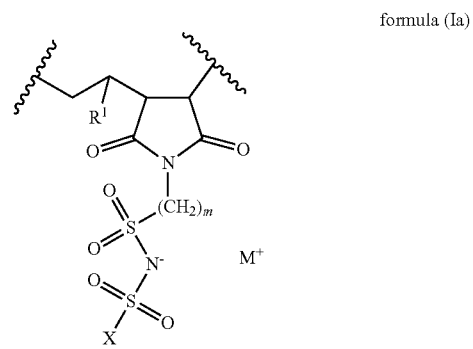

formula (Ia)

wherein $R^1$ is H, or $C_1$ to $C_{16}$ linear or branched alkyl, alkenyl, alkinyl;

m is 1 to 5;

each $M^+$ is independently selected from $Li^+$, $Na^+$ or $K^+$; and

X is selected from $CF_3$, $CH_3$, or F;

and the polymer has an average molecular weight of 350.000 to 1.200.000 Da.

2. A solid single-ion conductive polymer according to claim 1, wherein the polymer is of formula (I)

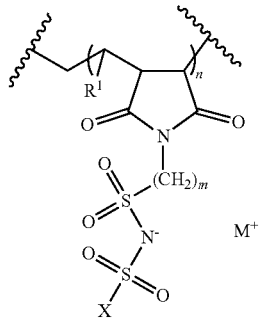

formula (I)

Wherein
R$^1$ is H, or C$_1$ to C$_{16}$ linear or branched alkyl, alkenyl, alkinyl;
n is 85 to 3900;
m is 1 to 5;
each M$^+$ is independently selected from Li$^+$, Na$^+$ or K$^+$;
X is selected from CF$_3$, CH$_3$, CBR$_3$, CCl$_3$, F, Cl, Br, H or OH.

3. The solid single-ion conductive polymer of claim 1, wherein R1 is a C10-C18 linear or branched alkyl.

4. The solid single-ion conductive polymer of claim 1, wherein m is 2.

5. The solid single-ion conductive polymer of claim 1, wherein X is CF3.

6. The solid single-ion conductive polymer of claim 1, wherein R1 is C16 linear alkyl, m is 2, M+ is Li and X is CF3 and the polymer has an average molecular weight of 400.000 Da to 1.000.000 Da.

7. An electrode for a battery comprising the solid single-ion conductive polymer of claim 1.

8. The electrode of claim 7, wherein said electrode is a cathode additionally comprising cathode electroactive material and optionally a conductive carbon, preferably the cathode electroactive material is selected from lithium cobalt oxide, lithium mangane nickel cobalt oxide, lithium nickel cobalt aluminium oxide, lithium iron phosphate, or a spinel.

9. The electrode of claim 7, wherein said electrode is an anode, additionally comprising anode electroactive material and optionally a conductive carbon, preferably wherein the anode electroactive material is selected from graphite or carbon nanotubes, silicium, lithiumtinatates or tin oxide.

10. The electrode according to claim 7, wherein the electrode comprises about up to 10 wt %, about up to 15 wt % or about up to 20 wt % of the solid single-ion conductive polymer.

11. The electrode according to claim 7, wherein the electrode was calendered at a temperature of between 20 to 110° C.

12. The electrode according to claim 7, wherein the electrode has a porosity of about 10% to about 50%.

13. An electrolyte for use in batteries, comprising a solid single-ion conductive polymer comprising a repeat unit of formula (Ia):

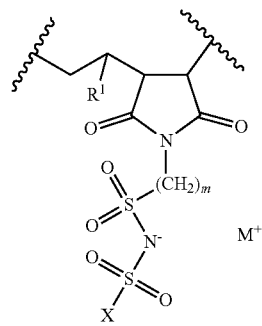

formula (Ia)

wherein R$^1$ is H, or C$_1$ to C$_{16}$ linear or branched alkyl, alkenyl, alkinyl;
m is 1 to 5;
each M$^+$ is independently selected from Li$^+$, Na$^+$ or K$^+$; and
X is selected from CF$_3$, CH$_3$, or F;
and the polymer has an average molecular weight of 350.000 to 1.200.000 Da.

14. A battery comprising at least one electrode or an electrolyte comprising a solid single-ion conductive polymer comprising a repeat unit of formula (Ia):

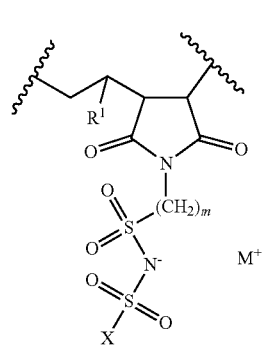

formula (Ia)

wherein R$^1$ is H, or C$_1$ to C$_{16}$ linear or branched alkyl, alkenyl, alkinyl;
m is 1 to 5;
each M$^+$ is independently selected from Li$^+$, Na$^+$ or K$^+$; and
X is selected from CF$_3$, CH$_3$, or F;
and the polymer has an average molecular weight of 350.000 to 1.200.000 Da.

15. A method for producing a solid-single-ion conductive polymer according to claim 1 comprising the steps of:
a) providing a polymer of formula (II)

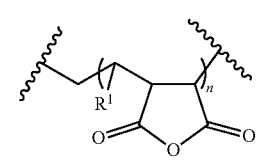

formula (II)

wherein
R$^1$ is H, or C$_1$ to C$_{16}$ linear or branched alkyl, alkenyl, alkinyl; and
n is 85 to 3900;

b) reacting said polymer under suitable conditions with a compound of formula (III)
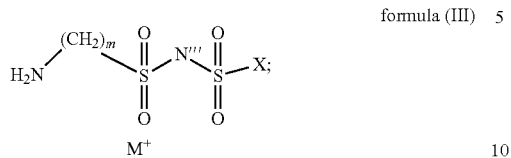
formula (III)
Wherein
m is 1 to 5;
$M^+$ is selected from $Li^+$, $Na^+$ or $K^+$;
X is selected from $CF_3$, CH3, $CBR_3$, $CCl_3$, F, Cl, Br, H or OH.
* * * * *